(12) United States Patent
Sandberg (10) Patent No.: US 9,609,798 B2
(45) Date of Patent: Apr. 4, 2017

(54) SUSPENSION DEVICE IN AGRICULTURAL IMPLEMENT

(71) Applicant: Vaderstad-Verken AB, Vaderstad (SE)

(72) Inventor: Bengt Sandberg, Vadstena (SE)

(73) Assignee: Vaderstad-Verken AB, Vaderstad (SE)

( * ) Notice: Subject to any disclaimer, the term of this patent is extended or adjusted under 35 U.S.C. 154(b) by 0 days.

(21) Appl. No.: 14/423,104

(22) PCT Filed: Sep. 25, 2013

(86) PCT No.: PCT/SE2013/051115
§ 371 (c)(1),
(2) Date: Feb. 20, 2015

(87) PCT Pub. No.: WO2014/051507
PCT Pub. Date: Apr. 3, 2014

(65) Prior Publication Data
US 2015/0250088 A1    Sep. 10, 2015

(30) Foreign Application Priority Data

Sep. 27, 2012  (SE) ..................................... 1251093.9

(51) Int. Cl.
*A01B 61/04*      (2006.01)
*F16F 1/48*       (2006.01)
(Continued)

(52) U.S. Cl.
CPC ............ *A01B 61/046* (2013.01); *A01C 7/205* (2013.01); *F16F 1/545* (2013.01)

(58) Field of Classification Search
CPC .......... B60G 11/22; B60G 11/225; F16F 1/48; A01B 71/04; A01B 61/044; A01B 61/04; A01B 61/046
(Continued)

(56) References Cited

U.S. PATENT DOCUMENTS 2,621,923 A * 12/1952 Krotz ...................... F16F 1/387
267/281
2,729,442 A    1/1956 Neidhart
(Continued)

FOREIGN PATENT DOCUMENTS

DE         1755250        2/1972
DE         4202771 A1     5/1993
(Continued)

OTHER PUBLICATIONS

International Search Report for PCT/SE2013/051115 dated Oct. 1, 2014.
(Continued)

*Primary Examiner* — John G Weiss
(74) *Attorney, Agent, or Firm* — Olive Law Group, PLLC (57) ABSTRACT

The present document shows a spring suspension device for an agricultural implement, including a casing, a beam extending through the casing, and four spring elements disposed in a space between the casing and the beam. The casing and the beam are resiliently rotatable relative to each other about a rotational axis extending along a longitudinal direction of the beam. The spring elements differ substantially from each other with respect to shape or material properties, and first and second side faces of the beam, which interact with the respective spring elements, differ substantially from each other with respect to the radius of curvature, viewed in a plane perpendicular to the longitudinal direction.

13 Claims, 7 Drawing Sheets

(51) Int. Cl.
*F16F 1/54* (2006.01)
*A01C 7/20* (2006.01)

(58) Field of Classification Search
USPC .............. 172/497, 498; 267/258, 279–281; 280/124.13
See application file for complete search history.

(56) References Cited

U.S. PATENT DOCUMENTS

| | | | |
|---|---|---|---|
| 3,575,243 A | 4/1971 | Mark et al. | |
| 3,687,479 A * | 8/1972 | Kober | B60G 11/225 267/258 |
| 3,779,576 A * | 12/1973 | Malcolm | B60G 5/005 267/279 |
| 4,223,742 A * | 9/1980 | Stark | A01B 29/00 172/456 |
| 5,031,885 A * | 7/1991 | Schwerdt | F16F 1/387 248/609 |
| 5,279,236 A * | 1/1994 | Truax | A01B 21/086 111/139 |
| 5,303,907 A * | 4/1994 | Holzheimer | F16F 1/3821 267/279 |
| 6,047,957 A * | 4/2000 | Sitter | F16F 1/387 267/281 |
| 6,102,132 A * | 8/2000 | Schimke | A01B 15/18 111/139 |
| 7,195,307 B2 * | 3/2007 | Tucker | B62D 25/10 16/225 |
| 8,196,911 B2 * | 6/2012 | Baumbarger | B62D 21/11 267/141.2 |
| 8,434,749 B2 * | 5/2013 | Rogge | F16F 1/3863 267/269 |
| 8,925,910 B2 * | 1/2015 | George | F16F 1/545 267/279 |

FOREIGN PATENT DOCUMENTS

| | | | |
|---|---|---|---|
| DE | 4202771 A1 * | 8/1993 | ............ A01B 15/18 |
| EP | 0 404 530 A1 | 12/1990 | |
| EP | 1 541 003 B1 | 6/2005 | |
| EP | 2 404 489 A1 | 1/2012 | |
| GB | 652266 A | 4/1951 | |
| GB | 730167 | 5/1955 | |
| SE | 534 357 C2 | 7/2011 | |
| WO | 2010/144025 A1 | 12/2010 | |
| WO | 2012/078108 A1 | 6/2012 | |

OTHER PUBLICATIONS

Written Opinion of the International Searching Authority for PCT/SE2013/051115 dated Jan. 1, 2014.

* cited by examiner

SUSPENSION DEVICE IN AGRICULTURAL IMPLEMENT

TECHNICAL FIELD

The present document relates to a spring suspension device for an agricultural implement and to an agricultural implement having such a spring suspension device.

BACKGROUND

GB652266A and EP1541003B1 show spring suspension devices of a type which is used in an agricultural implement and which comprises an inner square tube disposed in an outer casing, wherein the square tube and the casing are rotated through 45° in relation to each other and rubber rods are disposed in the substantially triangular spaces which are formed between the outer surface of the square tube and the inner surface of the casing.

SE534357C2 shows a similar spring suspension device, which substantially consists of a triangular tube and a casing of triangular cross section, which are rotated through 60° relative to each other and are provided with rubber rods in the formed triangular spaces.

Suspension devices of the above type are usually placed such that the square tube or the triangular tube extends substantially horizontally and perpendicularly to a direction of advance of the agricultural implement, so that a spring movement is performed in a vertical plane which is parallel with the direction of advance.

In some applications, it would be desirable to provide spring suspension devices which are stiffer, viewed in a direction perpendicular to the direction of advance.

In other applications, it would be desirable to provide spring suspension devices which, given a certain spring characteristic in the vertical plane, occupy less space in a direction perpendicular to the direction of advance.

In other applications, it would be desirable to provide spring suspension devices which have improved damping.

To this end, it is desirable to provide spring suspension devices whose spring characteristic in the lateral direction is less dependent on the spring characteristic in the direction of advance.

SUMMARY

One object of the present document is therefore to provide a spring suspension device which is improved in at least one of the above respects.

The invention is defined by the appended independent claims. Embodiments emerge from the appended dependent claims, from the following description and from the drawings.

According to a first aspect, a spring suspension device for an agricultural implement is provided, comprising a casing, a beam extending through the casing, and at least two spring elements disposed in a space between the casing and the beam. The casing and the beam are resiliently rotatable relative to each other about a rotational axis extending along a longitudinal direction of the beam. The said at least two spring elements differ substantially from each other with respect to shape and/or material properties, and first and second side faces of the beam, which interact with the respective spring elements, differ substantially from each other with respect to the radius of curvature, viewed in a plane perpendicular to the longitudinal direction.

By "side face" is meant the main surfaces of the beam, excluding what might be deemed to constitute transitional portions at the corners of the beam.

By "rotational axis" is here meant an approximate axis about which rotation can occur. It will be appreciated that in spring suspension devices according to the present type, the rotational axis can be displaced somewhat in dependence on the size and direction of the loads.

By "differ substantially" is meant that the difference extends beyond that which is attributable to production tolerances.

By utilizing a combination of differently sized spring elements and side faces which have slight radii of curvature (i.e. are not flat), it is possible to provide a spring suspension device which has different characteristics when loaded with forces from different directions in the cross-sectional plane. For example, it is possible to provide a spring suspension device which is stiffer in one direction (for example vertically) than in another direction (for example horizontally), at the same time as the spring suspension device can be given a longer spring travel under torsional load. It is also possible to provide a spring suspension device which has higher stiffness in the lateral direction (rotation about an axis parallel with the direction of advance), at the same time as the stiffness upon rotation about a substantially transverse axis (viewed relative to the direction of advance) can be maintained or even reduced.

The said first and second side faces of the beam can constitute substantially adjacent side faces.

The beam can have pairs of opposite side faces, wherein the side faces of one pair of opposite side faces can have substantially the same radius of curvature.

At least one of the said side faces can be substantially convex, viewed in the said plane perpendicular to the longitudinal direction.

The beam can be configured substantially as a square tube, in which the first pair of opposite side faces has a smaller radius of curvature than the second pair of opposite side faces.

The first pair of opposite side faces can constitute upper and lower side faces, and the second pair of opposite side faces can constitute substantially vertical side faces.

A spring element which interacts with a side face having a smaller radius of curvature can have a lesser radial extent than a spring element which interacts with a side face having a larger radius of curvature.

By "radial extent" is here meant radial in relation to the centre axis of the beam. Furthermore, extent relates to the unloaded state.

The spring suspension device can comprise pairs of spring elements situated on opposite sides of the beam, and at least one of the spring elements of a first of the said pairs can differ substantially with respect to shape and/or material properties from at least one spring element of a second of the said pairs of spring elements.

Two spring elements which constitute a pair of spring elements can be substantially identical with respect to shape and/or material properties.

The above-said shape can be at least one of a cross-sectional shape, a cross-sectional area, a length, and a cross-sectional variation along a longitudinal direction of the spring element.

The above-said material properties can be at least one of a material type and a hardness.

According to a second aspect, use of a spring suspension device as described above in an agricultural implement is provided.

The spring suspension device can be used to cushion a ground-engaging part, wherein the ground-engaging part is chosen from a group consisting of a harrow disc, a seed disc, a disc share, a levelling tool, a strip-till tine, a fertilizing disc, a wheel, a wheel carrier, a compacting roller, a tined share and a harrow tine.

The ground-engaging part can thus be protected from damage upon collision with rocks, for example, can be made to follow the contours of the ground and thus maintain a predetermined tilling depth, and/or can help to produce a given bearing force against the ground with a configuration in which the beam can be rotated to produce an adjustable pretension against the ground.

According to a third aspect, an agricultural implement comprising at least one spring suspension device as described above is provided.

DESCRIPTION OF EMBODIMENTS

Figure 1:
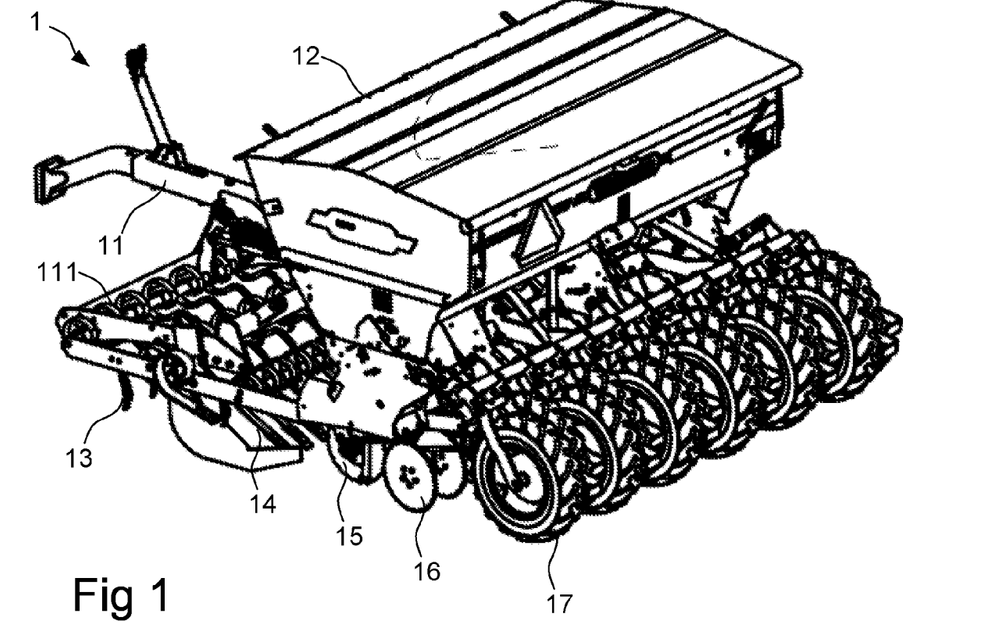
FIG. 1 is a perspective view of an agricultural implement in the form of a seed drill.
Figure 2:
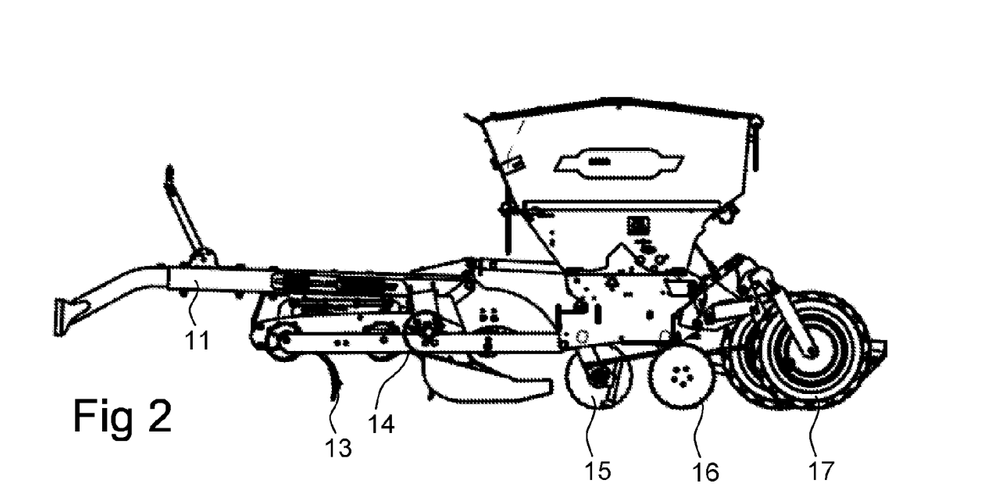
FIG. 2 is a side view of the agricultural implement in FIG. 1.

FIG. 1 shows an agricultural implement 1 in the form of a seed drill, which has a frame 11, a seed box 12, and a plurality of soil-cultivating tools, here in the form of harrow tines 13, levelling implements 14, two rows of seed discs 15, 16, and compactor wheels 17.

Figure 3:
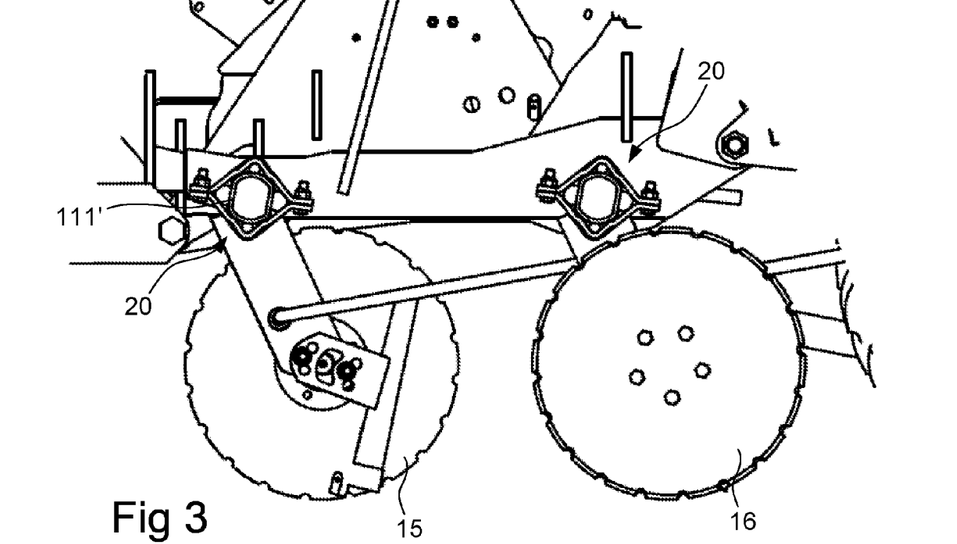
FIG. 3 is a detailed view of the side view in FIG. 2.

The frame 11 can comprise a longitudinal beam 11, as well as a plurality of transverse beams 111, 111' from which the tools 13, 14, 15, 16, 17 can be suspended. In the shown example, the harrow tines 13 and the levelling implements 14 comprise a part made of spring steel and thus produce a springiness in the respective tool. The seed discs 15, 16, however, are suspended from a respective rigid arm 25 (FIG. 3), and therefore a spring suspension device 20 has been arranged between the beam 111' and the arm 25.

Figure 4A:
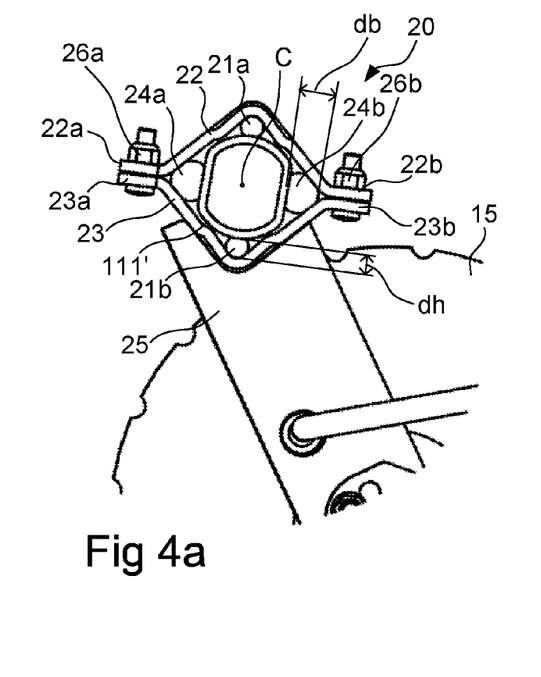
FIGS. 4a-4b are side views of a spring suspension device in different load scenarios.
Figure 4B:
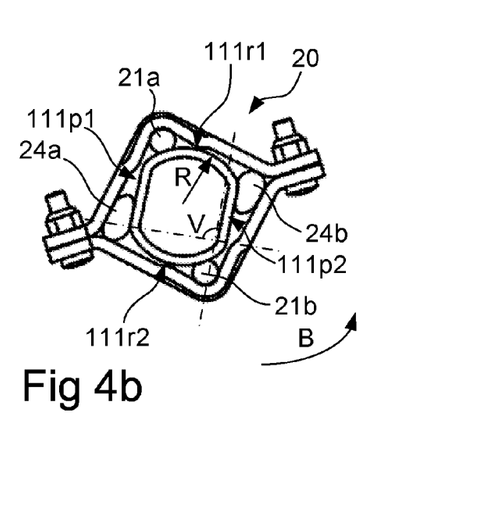

In FIG. 4a, the spring suspension device 20 and the arm 25 are shown in the mounted but unloaded state. In FIG. 4b, the spring suspension device 20 is shown in the loaded state, in which the casing 22, 23 has been rotated in the direction B about the rotational axis C of the spring suspension device 20.

The spring suspension device 20 comprises a beam 111', which is configured as a modified square beam, in which upper and lower side faces $111r1$, $111r2$ are substantially convex. Specifically, the side faces $111r1$, $111r2$ can be curved into, for example, substantially parabolic shape, substantially elliptical shape, or substantially circular shape. In the shown example, the side faces $111r1$, $111r2$ have a circular shape with a radius of curvature R which is equal in size to the distance from the centre C of the beam to the side faces $111r1$, $111r2$. The vertical side faces $111p1$, $111p2$ can, but do not necessarily have to be substantially flat, i.e. have "an infinite radius of curvature".

The spring suspension device further comprises a casing, which is formed by two parts 22, 23 joined together by fastening members, here in the form of screw and bolt joints, which engage with flanges 22a, 23a; 22b; 23b of the casing 22, 23 in a manner which is known per se. The arm 25 is fixed to one of the parts 23, for example by a weld joint.

Precisely as in the known spring suspension devices, as have been discussed above, the beam 111' and the casing 22, 23, which form a square cavity, are rotated through about 45° in relation to each other, so that four triangular spaces are formed, in which the respective side faces $111p1$, $111p2$, $111r1$, $111r2$ of the beam 111' form a longest side of the respective triangular space.

In each triangular space is placed a spring element 21a, 21b, 24a, 24b. By the mounting of the spring elements 21a, 21b, 24a, 24b in the spaces, the spring elements 21a, 21b, 24a, 24b are deformed and are clamped between the beam 111' and the casing 22, 23 in the respective space.

The spring elements here comprise two pairs of mutually similar spring elements, in which a first pair of spring elements 21a, 21b are configured to interact with the convex side faces $111r1$, $111r2$ of the beam 111 and a second pair of spring elements are configured to interact with the flat side faces $111p1$, $111p2$ of the beam 111.

In the shown example, all spring elements have the same shape in the unloaded state, but different cross-sectional area: the first spring elements 21a, 21b have substantially smaller cross-sectional area than the second spring elements 24a, 24b.

Figure 11A:
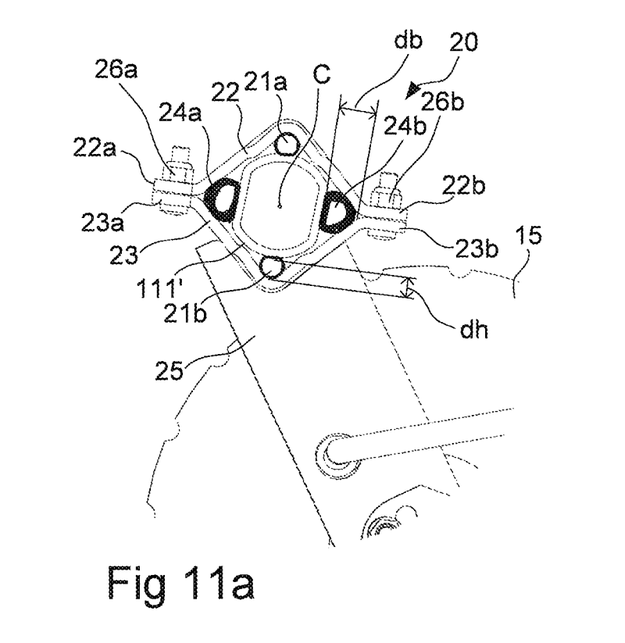
FIGS. 11a-11b are side views of a spring suspension device in different load scenarios depicting spring elements made of different materials.
Figure 11B:
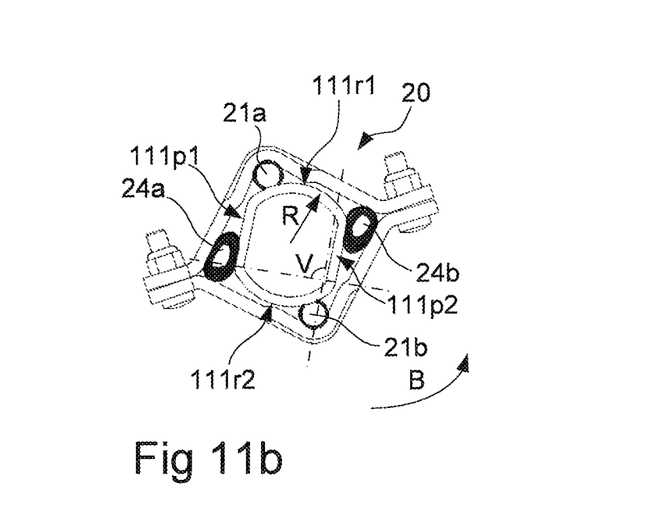

In FIGS. 11a and 11b, there is illustrated another embodiment of the spring suspension device 20, wherein the elements 24a, 24b on one hand, and the elements 21a, 21b, on the other hand, are made of different materials.

Figure 5:
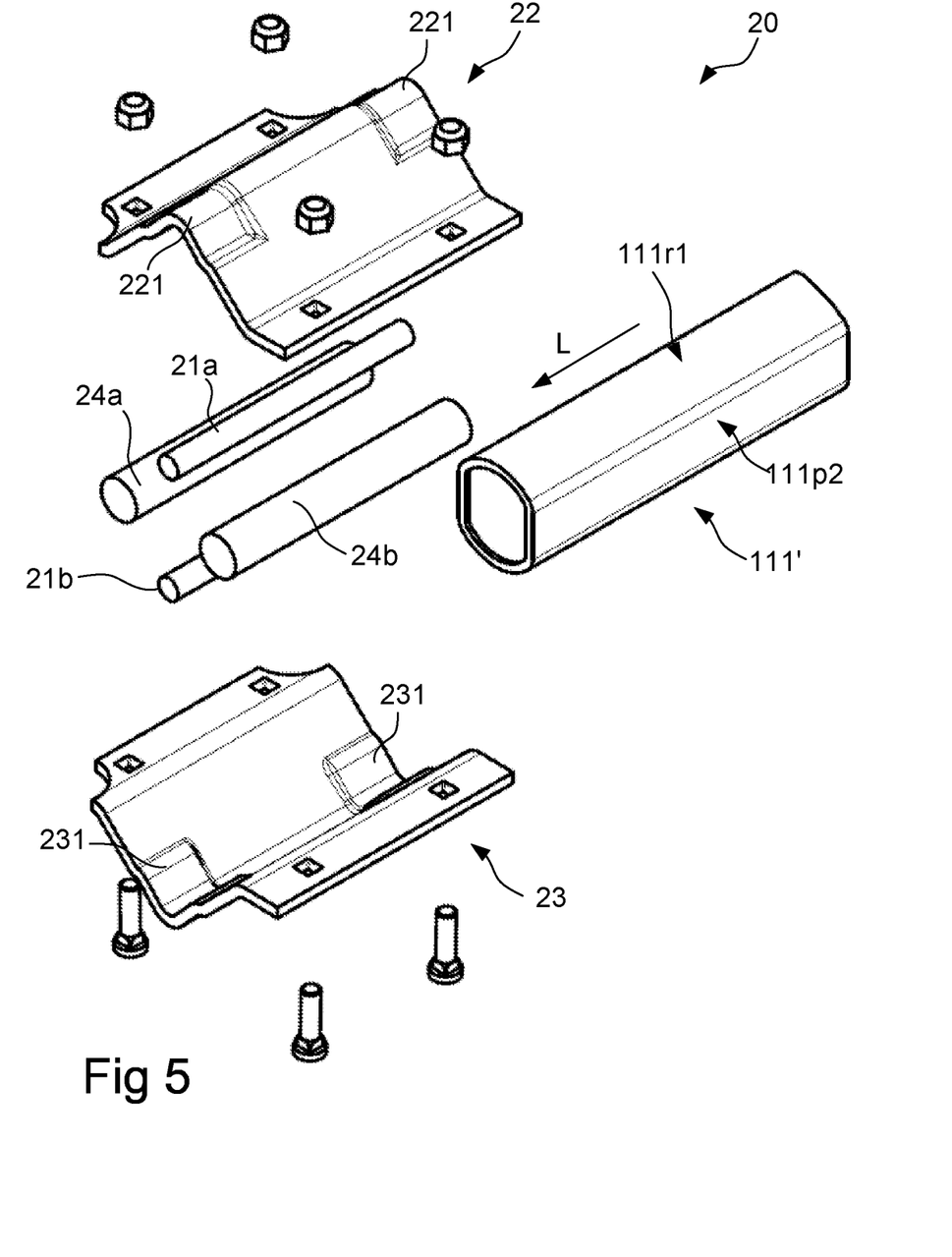
FIG. 5 is an exploded diagram/perspective view of the spring suspension device in FIGS. 4a/4b.

With reference to FIG. 5, the casing 22, 23 can have arranged on its axial end portions inwardly extending protrusions 221, 231, which are designed to prevent axial relative movement between, on the one hand, the casing 22, 23 and the beam 111' and, on the other hand, the spring elements 21a, 21b, 24a, 24b.

Figure 12:
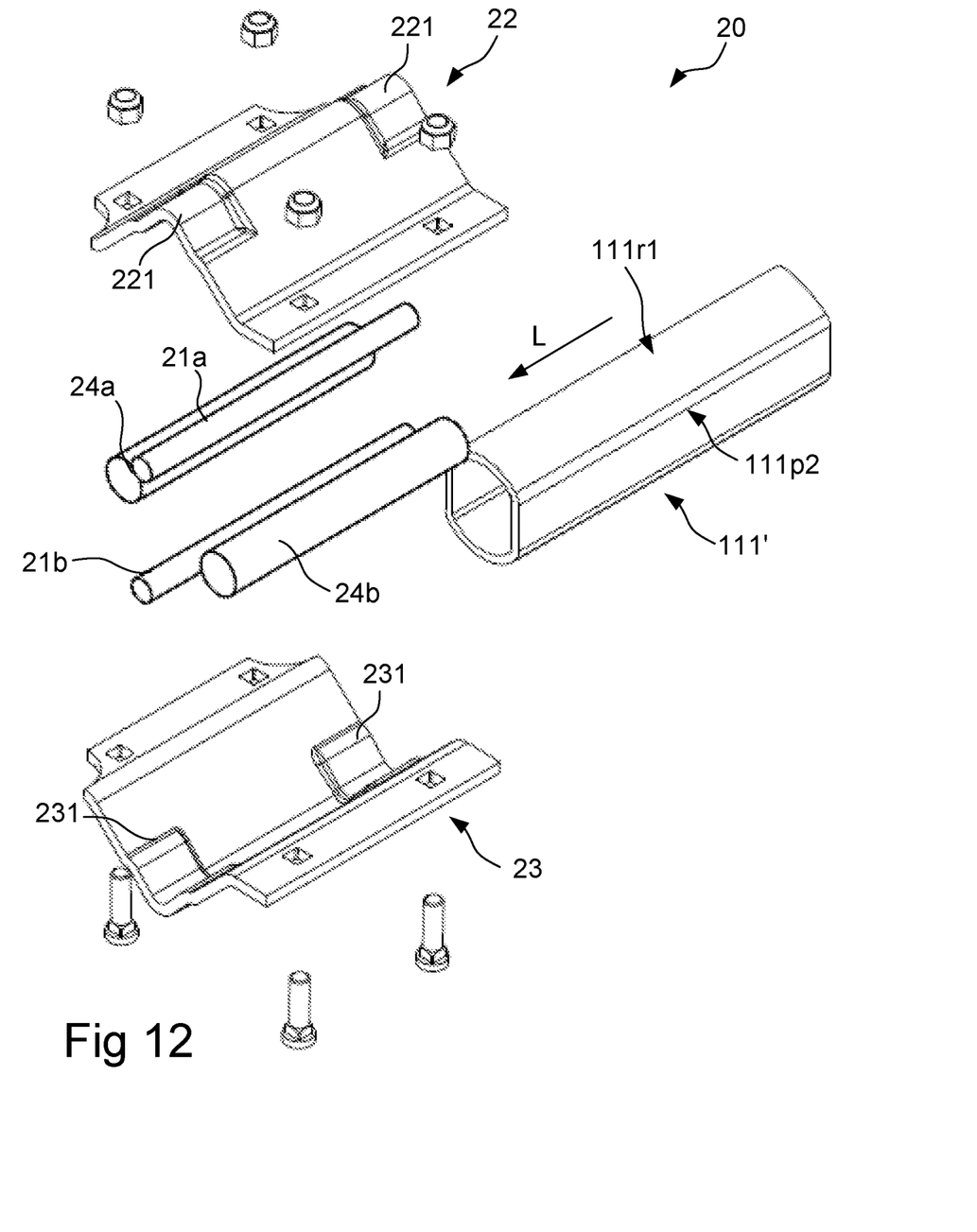
FIG. 12 is an alternate exploded diagram/perspective view of the spring suspension device in FIGS. 4a/4b and 11a/11b.

With reference to FIG. 12, there is illustrated an embodiment of the spring suspension device 20, wherein the elements 24a, 24b on one hand, and the elements 21a, 21b, on the other hand, are of different lengths.

Figure 6A:
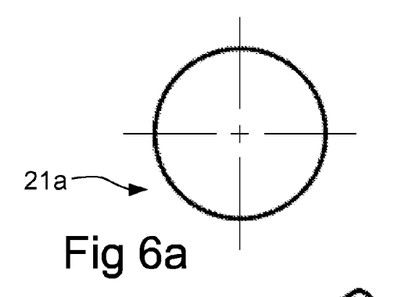
FIGS. 6a-6b show a variant of a spring element.
Figure 6B:
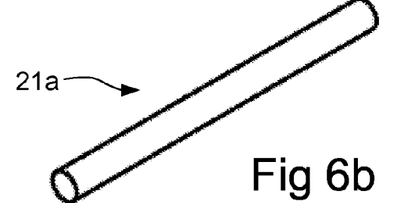

FIGS. 6a and 6b show a spring element 21a according to the configuration which appears in FIGS. 4a-5.

Figure 7A:
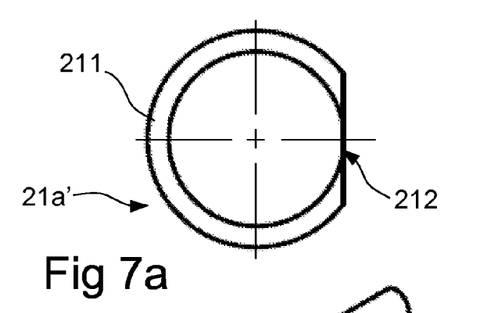
FIGS. 7a-7b show another variant of a spring element.
Figure 7B:
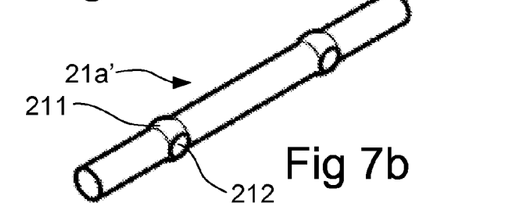

FIGS. 7a, 7b show an alternative embodiment of a spring element 21a', which has been provided with a pair of annular ridges 211, as well as a supporting portion 212, which is configured to bear against the side face $111r1$, $111r2$ in order to reduce the risk of the spring element 21a' rolling off the beam 111' in connection with mounting of the spring suspension device 20. In the shown embodiment, the supporting portion 212 is configured as a cut-away portion of the ridge 211. It will be appreciated that a supporting portion can be produced in many different ways, for example by providing a flat (for example flattened or cut away) supporting surface along the entire length of the spring element 21a.

Figures 8A, 8B:
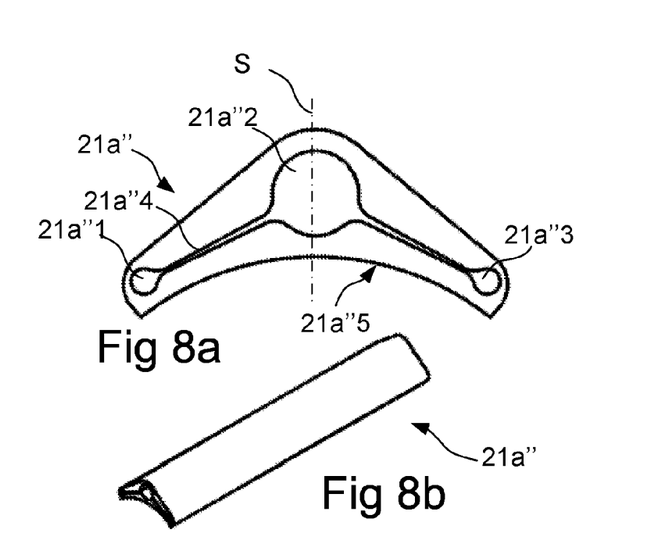
FIGS. 8a-8b show yet another variant of a spring element.

FIGS. 8a, 8b show a further embodiment of the spring element 21a", which has been configured as a body having a cross section which substantially corresponds to the triangular space between rounded side faces 111r1, 111r2 of the beam 111' and the casing 22, 23. The body can be hollow and have one or more cavities 21a"1, 21a"2, 21a"3 extending along the profile. In the shown embodiment, the body is symmetrical along the plane S and has a central cavity 21a"2, which is divided into equal parts of this plane. At the distal ends of the body, viewed from the plane S, further cavities 21a"1, 21a"3 can be situated. The distal cavities 21a"1, 21a"3 can have smaller cross-sectional area than the central cavity 21a"2.

The cavities 21a"1, 21a"2, 21a"3 can be connected by a channel 21a"4, which can be configured such that the surfaces which delimit the channel 21a"4 can be displaced relative to one another when the spring element 21a" is subjected to a shearing force. These surfaces can be configured to slide one against the other when the spring element 21a" is subjected to a shearing force.

In addition, the body can have a curved, for example concave, surface 21a"5, which in shape and size substantially corresponds to the side face 111r1 of the beam 111' with which the spring element 21a" shall interact.

The spring elements 21a, 21a', 21a", 21b, 24a, 24b can be constituted by a body formed of a rubber or rubber-like material and can have a substantially cylindrical shape. By rubber-like materials is meant materials which have rubber-like properties, i.e. are flexible, resilient and have hysteresis.

Especially the spring element 21a" shown in FIGS. 8a-8b can be made of rubber or rubber-like materials, but also of other materials, such as thermoplastic. For example, the spring element 21a" can be configured as an injection-moulded or extruded profile.

As can be seen from the above, the spring elements which interact with rounded side faces 111r1, 111r2 can be substantially mutually identical, regardless of whether the configuration is according to FIGS. 6a-6b, 7a-7b or 8a-8b, or other.

In the same way, the spring elements 24a, 24b which interact with substantially flat side faces 111p1, 111p2 of the beam 111' can be substantially mutually identical.

The spring elements which interact with rounded side faces 111r1, 111r2 can be made of materials having greater hardness than the substantially flat side faces 111p1, 111p2 of the beam 111'. For example, the former spring elements can have a hardness of around 80 Shore A and the latter spring elements around 70 Shore A.

The beam 111', the casing 22, 23 and the spring elements 21a, 21b, 24a, 24b, 21a', 21a" can be configured such that the beam and the casing can be sufficiently rotated relative to each other without direct contact arising between the beam and the casing, since this can lead to wear on the beam and/or the casing.

In addition, the beam 111' and the casing 22, 23 are configured such that a greatest radial distance dh between the rounded side face 111r1, 111r2 and the casing 22, 23 is less than a greatest radial distance db between the flat side face 111p1, 111p2 of the beam and the casing 22, 23.

It will be appreciated that each spring element can, but does not necessarily have to be configured in one piece. It is possible to provide a spring element in the form of a plurality of spring element parts, which are placed in a row along the longitudinal direction L of the beam.

Figure 9:
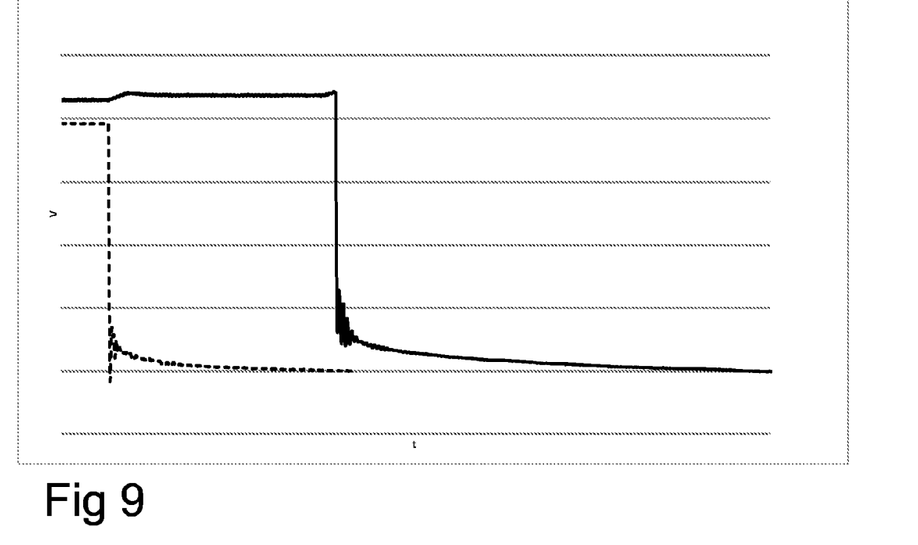
FIG. 9 is a graph showing spring angle as a function of time for a spring suspension device according to the prior art and for a spring suspension device according to the invention.

FIG. 9 shows a rebound curve (angle v as a function of time t) of a spring suspension device of known type, according to, for example, GB652266A (dashed line), compared with a rebound curve of a spring suspension device according to the present invention (unbroken line).

As can be seen from FIG. 9, a shorter return stroke and a somewhat longer damping curve are produced with the invention, which means reduced stress on beam, fastening and tool.

Figure 10:
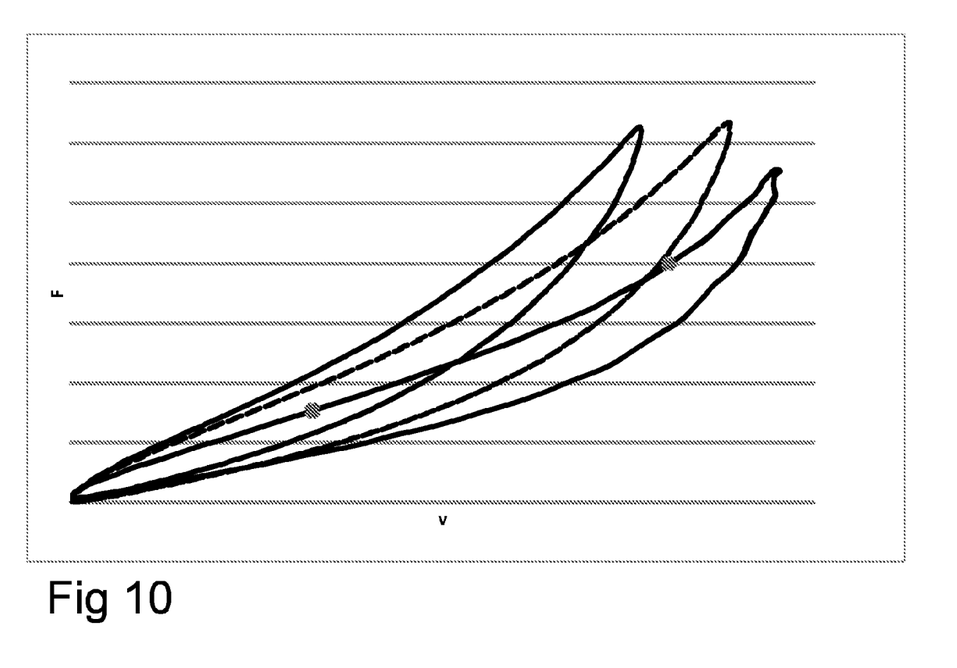
FIG. 10 is a graph showing spring force as a function of suspension angle for spring suspension devices according to the prior art and for a spring suspension device according to the invention.

FIG. 10 shows rebound curves (force F as a function of angle v) of spring suspension devices of known type (dashed lines), compared with a spring suspension device according to the invention (unbroken line). The left-hand curve (longer dash) relates to a spring suspension device configured according to GB652266A and the middle curve (shorter dash) relates to a spring suspension device according to SE534357C2.

As can be seen from FIG. 10, longer spring travel is achieved with the invention.

A spring suspension device 20 as described above can be used for the fastening of tools such as discs, disc shares, levelling tools, strip-till tines, fertilizing discs, wheels, wheel carriers, compacting rollers or tined shares. In addition, the spring suspension device can be used for other applications in agricultural implements, such as, for example, tensioning devices for belts and the like.

A spring suspension device as described herein has especially wide application in tools which are configured to move soil in the lateral direction, such as, for example, various kinds of discs, and in tools in which high stiffness in the lateral direction needs to be combined with good ground flexibility, such as, for example, different types of seeding and fertilizing devices, in order to maintain a constant distance between rows of discharged material.

It will be appreciated that the beam 111' can, but does not necessarily have to be configured as a square beam. It is conceivable to utilize a beam of arbitrary basic cross section, and in which at least one side face has been modified in order to have a smaller radius of curvature than at least one other side face. The modified (with slight radius of curvature) side face can, but does not necessarily have to lie adjacent to an unmodified (for example flat) side face. For example, the modified face and the unmodified face can have an intermediate angle V measuring in the order of magnitude of 60°-120° where a beam having between three and six edges is utilized. In the shown example, the intermediate angle V is 90°. As a further example, an L-shaped beam, in which one flange forms a side face which has a larger area of curvature than the side face formed by the second flange, can be used. Such an L-shaped beam can be supplemented by a bearing device which allows rotary movement, at the same time as the spring elements are held compressed against the side faces.

The invention claimed is:
1. Suspension device for an agricultural implement, comprising:
a casing,
a beam extending through the casing,
four spring elements disposed in a space between the casing and the beam,
wherein the casing and the beam are resiliently rotatable relative to each other about a rotational axis extending along a longitudinal direction of the beam, at least two of said four spring elements differ substantially from each other with respect to shape and/or material properties, and first and second side faces of the beam, which interact with the respective spring elements, differ substantially from each other with respect to the radius of curvature, viewed in a plane perpendicular to the longitudinal direction.

2. Suspension device according to claim 1, wherein said first and second side faces of the beam constitute adjacent side faces.

3. Suspension device according to claim 1 or 2, wherein the beam has pairs of opposite side faces, and wherein the side faces of one pair of opposite side faces have substantially the same radius of curvature (R).

4. Suspension device according to claim 1, wherein at least one of said side faces is convex, viewed in said plane perpendicular to the longitudinal direction.

5. Suspension device according to claim 1, wherein the beam is configured as a tube having a generally squared profile, in which the first pair of opposite side faces has a smaller radius of curvature than the second pair of opposite side faces.

6. Suspension device according to claim 5, wherein the first pair of opposite side faces constitutes upper and lower side faces, and wherein the second pair of opposite side faces constitutes substantially vertical side faces.

7. Suspension device according to claim 1, wherein a spring element which interacts with a side face having a smaller radius of curvature has a lesser radial extent than a spring element which interacts with a side face having a larger radius of curvature.

8. Suspension device according to claim 1, wherein the spring suspension device comprises pairs of spring elements situated on opposite sides of the beam, and wherein at least one of the spring elements of a first of said pairs differs substantially with respect to shape and/or material properties from at least one spring element of a second of said pairs of spring elements.

9. Suspension device according to claim 8, wherein two spring elements which constitute a pair of spring elements are substantially identical with respect to shape and/or material properties.

10. Suspension device according to claim 1, wherein the said shape is at least one of a cross-sectional shape, a cross-sectional area, a length, and a cross-sectional variation along a longitudinal direction of the spring element.

11. Suspension device according to claim 1, wherein said material properties are at least one of a material type and/or a hardness.

12. A method comprising:
providing a suspension device comprising:
a casing,
a beam extending through the casing,
four spring elements disposed in a space between the casing and the beam,
wherein the casing and the beam are resiliently rotatable relative to each other about a rotational axis extending along a longitudinal direction of the beam,
wherein at least two of said four spring elements differ substantially from each other with respect to shape and/or material properties, and
first and second side faces of the beam, which interact with the respective spring elements, differ substantially from each other with respect to the radius of curvature, viewed in a plane perpendicular to the longitudinal direction; and
using the spring suspension device in an agricultural implement.

13. The method of claim 12, wherein the spring suspension device is arranged to cushion a ground-engaging part, wherein the ground-engaging part is chosen from a group consisting of a harrow disc, a seed disc, a disc share, a levelling tool, a strip-till tine, a fertilizing disc, a transport wheel, a wheel carrier, a compacting roller, a surface compactor wheel, a tined share and a harrow tine.

* * * * *